(12) United States Patent
Corts (10) Patent No.: US 9,447,818 B2
(45) Date of Patent: Sep. 20, 2016

(54) FLUID-LEVELED BEARING PLATE

(76) Inventor: Jochen Corts, Remscheid (DE)

( * ) Notice: Subject to any disclaimer, the term of this patent is extended or adjusted under 35 U.S.C. 154(b) by 0 days.

(21) Appl. No.: 13/812,511

(22) PCT Filed: Jul. 26, 2011

(86) PCT No.: PCT/IB2011/002473
§ 371 (c)(1),
(2), (4) Date: Apr. 8, 2013

(87) PCT Pub. No.: WO2012/020315
PCT Pub. Date: Feb. 16, 2012

(65) Prior Publication Data
US 2013/0209007 A1 Aug. 15, 2013

Related U.S. Application Data

(60) Provisional application No. 61/367,665, filed on Jul. 26, 2010.

(51) Int. Cl.
| | |
|---|---|
| *F16C 29/02* | (2006.01) |
| *B21B 31/00* | (2006.01) |
| *F16C 29/00* | (2006.01) |
| *B21B 31/02* | (2006.01) |
| *B21B 28/00* | (2006.01) |

(Continued)

(52) U.S. Cl.
CPC ............ *F16C 29/001* (2013.01); *B21B 31/02* (2013.01); *F16C 29/025* (2013.01); *B21B 28/00* (2013.01); *B21B 31/20* (2013.01); *B21B 31/32* (2013.01); *Y10T 29/49641* (2015.01)

(58) Field of Classification Search
CPC .......... F16J 15/00; F16J 15/02; F16J 15/022; F16J 15/10; F16J 15/102; F16J 15/104; F16J 15/0887; F16J 15/0881; F16C 29/001; F16C 29/025; B21B 31/02; B21B 31/20; B21B 31/32; B21B 28/00; Y10T 29/49641
USPC ............................. 384/8, 12, 15, 16, 40, 42
See application file for complete search history.

(56) References Cited

U.S. PATENT DOCUMENTS

| 2,466,294 | A | * | 4/1949 | Allen ............................ 277/328 |
| 3,124,366 | A | * | 3/1964 | Hillman ........................ 277/612 |
| 5,687,975 | A | * | 11/1997 | Inciong ......................... 277/591 |

(Continued)

FOREIGN PATENT DOCUMENTS

| DE | 4402958 | A1 | * | 8/1995 | .............. B23P 6/00 |
| DE | 20104695 | U1 | | 9/2001 | |
| DE | 10261077 | A1 | | 7/2004 | |

OTHER PUBLICATIONS

Machine Translation of DE 102005004483 dated Aug. 10, 2006.*

(Continued)

*Primary Examiner* — Alan B Waits
(74) *Attorney, Agent, or Firm* — Billion & Armitage; John F. Klos (57) ABSTRACT

A linear bearing assembly including a linear bearing plate, a base plate to support the linear bearing plate within a machine, a sealing structure to seal a volume defined between the linear bearing plate and the base plate, and a fluid adapted to be injected into the volume via at least one injection port. The fluid is injected at a sufficient pressure so as to alter an orientation of the linear bearing plate or the base plate toward an initial geometric orientation.

11 Claims, 8 Drawing Sheets

(51) Int. Cl.
   *B21B 31/20* (2006.01)
   *B21B 31/32* (2006.01)

(56) References Cited

U.S. PATENT DOCUMENTS

| | | |
|---|---|---|
| 7,771,159 B2 * | 8/2010 | Johnson et al. .............. 415/135 |
| 2003/0009872 A1 | 1/2003 | Brown et al. |
| 2009/0165521 A1 | 7/2009 | Corts |
| 2010/0052260 A1 * | 3/2010 | Burger et al. ................. 277/316 |
| 2012/0187638 A1 * | 7/2012 | Bauer et al. ................... 277/639 |

OTHER PUBLICATIONS

Machine Translation of DE 4402958 dated Aug. 1995.*
International Search Report and Written Opinion of PCT/IB2011/002473 mailed Feb. 13, 2012.

* cited by examiner

FLUID-LEVELED BEARING PLATE

TECHNICAL FIELD

The present disclosure is directed to linear bearing technology. More particularly, the disclosure relates to a variety of steel and compound steel linear bearings including, but not limited to, rolling mill stands and other heavy equipment. A variety of flat and ring bearings may be manufactured or modified utilizing the present invention.

BACKGROUND OF THE INVENTION

The invention relates to linear bearings, such as used in heavy equipment, which provide linear load support and guidance particularly in applications where the area loads are too high to utilize the support and guidance through other kinds of rotational bearing elements, for example, due to the fact that the high area loads and resulting Hertzian stresses created in the contact zone would result in plastic deformation.

Linear bearing are used to support the lateral movement requested by the various processes and equipment such as bearing plates in mill windows of steel rolling mills. The bearing surfaces of those bearing plates are normally exposed to three major wear factors which include area loads, abrasion and corrosion. Wear, abrasion and corrosion typically lead to changes in the bearing plate geometry.

Abrasion and corrosion effectively increase the gap or play between two matching bearing surfaces and this increased play undesirably allows for relative movement of the equipment components. Due to the high dynamic energy of the moving components, the dynamic loads are proportional to the bearing play or gap. When dynamic loads reach a specific level, bearing plates transfer dynamic loads to bearing mounting and reference surfaces. The gap quickly grows and the output quality of the mill stand quickly degrades.

A direct relation between the hardness and stiffness of the material used for the bearing plates exists, because the hardness of any material is directly proportional to the stiffness and inflexibility of the material. A harder bearing plate material will deform a softer counterpart and as soon as the hardness of the bearing plate exceeds the hardness of the related mounting surface, the bearing plate will apply dynamic loads to its mounting counterpart with the potential to elastically and plastically deform the mounting surface. With this resulting deformation the connection between the bearing plate and the mounting surface will gradually yield gaps. These gaps permit, through a capillary effect, humidity and wetness to seep between the matching surfaces of the bearing.

Humidity and wetness between the matching surfaces, e.g., between the bearing plate and the mounting surface, will initiate another wearing factor called contact corrosion. Both mounting surfaces start transforming iron into iron oxide which then is washed out by more humidity pumped in by the relative movement under the constant dynamic loads created by the process. The result is a constantly increasing play or gap not only between the matching bearing surfaces of the equipment components involved but also between the bearing plates and their related mounting surfaces.

With sufficient moisture, a liquid layer is formed between the bearing plates and their related mounting surfaces. When high dynamic loads are applied to this liquid layer, cavitation occurs and leads to another wear mechanism. Cavitation increases the washout of the mounting surfaces which in turn gradually changes the geometry of those mounting surfaces. Due to the fact that mounting surfaces are at the same time the reference surfaces for the installation of the linear bearing plates, the equipment is gradually altered from its desired geometrical set-up.

Changes of the basic equipment geometry, for example a window of a rolling mill, will have a direct influence on the basic function of the equipment. In case of a rolling mill the changes of the mill window geometry change the geometrical relation of the rolls to each other which then in return has a direct influence on the rolling process as well as the geometry of the rolled products.

When any combination of the given process related limits are exceeded, the mill window geometry and reference base for the bearing plates has to be corrected. For such corrections there have been two basic processes. Prior to the present invention the play, gap or volume created be the erosion and wear and tear have been compensated by filling the gap with shims or injecting an appropriate resin material. Next, the surfaces are re-machined to new accuracy and the increased opening of the mill window compensated with the increasing of the bearing plate thickness. The selection of the correction method is driven by cost and time because the complete rolling mill has to be fully stopped to be able to apply the desired compensation technology. The quickest and cheapest approach has often been shimming or filling with resin and finally re-machining.

Figure 10:
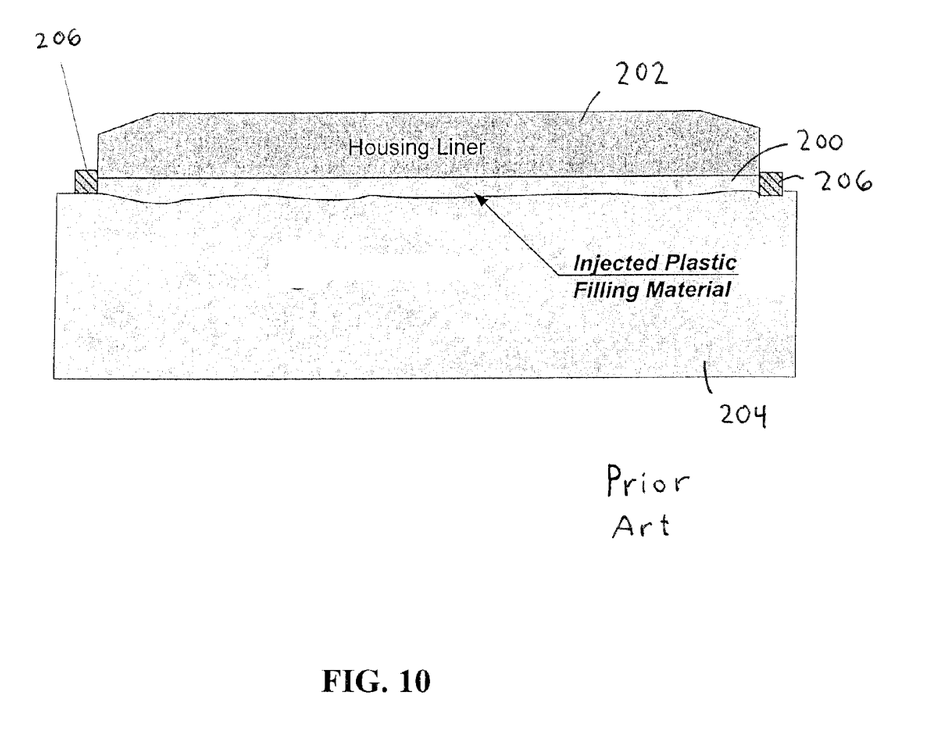
FIG. 10 is an illustration of a prior art approach to linear bearing rehabilitation.

The prior art approach of applying the resin included steps of first mechanically adjusting the bearing plate geometry by using a combination of thrust and tension screws to provide a specific spacing between the bearing and mounting surface. Next, a seal was provided to surround the bearing plate and finally resin was injected between the bearing plate and the adjacent mounting surface. FIG. 10 illustrates such a process wherein a resin material 200 is injected between the housing liner 202 and the housing body 204. The resin material is injected under pressure and is maintained by a seal structure 206 surrounding the housing liner 202. The injected resin material 200 fills the interior volume defined between the housing liner 202 and the worn surface of the housing body 204. The success and durability of this methodology is strongly dependant on the preparation and cleanliness of the surfaces which are in direct contact with the resin. Due to the extremely hostile environment of the equipment to be repaired, the constant presence of oil and grease and also the dimensions and mostly vertical orientation of the mounting surfaces, it is very difficult to insure cleanliness of the resin-engaging surfaces necessary for rehabilitation of the bearing system. Due to the fact the resin has to be injected it has to be based on a 2-component epoxy which also needs a specific environmental temperature to be correctly applied. Also desirable temperature conditions for resin-setting are difficult, if not impossible, to maintain under the normal conditions of the facility.

There exist several negative effects of the application of plastic filling material or resin on the mounting surfaces of the mill housing body. Due to the difficulty of cleaning the mounting surface of the housing body, the contact between the resin and the worn out mounting surface is often not adequately maintained. Subsequent dynamic loads on the bearing plate further open a gap or create contact zones between the resin and the mounting surface allowing chemicals and liquid to seep in and cause corrosion. The plastic filling material or resin may also form bubbles which promote de-lamination and corrosion.

Thus, a need exists for a safe, economically efficient and robust approach so as remove the limitations of the prior art approaches to bearing maintenance and operation, particularly for linear bearings operating in hostile environments.

SUMMARY OF THE INVENTION

The invention relates to linear bearings, such as used in heavy equipment, which provide linear guidance particularly in applications where the area loads are too high to utilize the guidance through other kinds of rotational bearing elements.

Embodiments of the present invention provide a novel approach and combination of the advantages in methods, manufacturing and application of the existing solutions. With this new solution the two major targets of time reduction and cost optimization for the re-machining of the equipment can be reached. This increased security of the overall repair procedure is an especially important aspect, because the on-site conditions for the repair work are mostly non-optimal.

Embodiments of the invention may utilize the exceptional abrasion and corrosion protection abilities of the bearing surfaces through the proven technology of compound steel bearings (see PCT Application No. PCT/IB2009/007920 (International Publication No. WO 2010/064145), which is incorporated by reference herein in its entirety) and the geometrical flexibility of mounting those bearing plates in a mill window, which lost its original reference and mounting surface by filling the gap between the worn out mounting surface and the backside of the bearing plate by an appropriate resin (see German Patent Nr. DE 102005004483A1-10.08.2006, which is incorporated by reference herein in its entirety).

Embodiments of the present invention integrate a resin or other fluid into a volume defined between the bearing plate and the base plate. The surface conditions within the volume are more easily controlled. The cleanliness of the surfaces as well as the temperature within the volume can be controlled to a far better degree. In one example, the integration of a base plate, the combination of thrust and tension screw, the surrounding sealing structure as well as the cleanliness of the injection volume offer the advantages of better preparation to the repair and re-machining work, more secure technical conditions for the injection as well as better and more secure protection of a corroded mounting surface against further corrosion after the repair. The application of the embodiments of the present invention are only limited by the maximum strength which can be used with resin. In areas where this strength of the resin is not high enough to withstand the area loads created by the process a re-machining of the mounting surfaces and the increasing of the bearing plate thickness may be unavoidable to secure the future process stability.

Embodiments of the present invention may also include the integration of a pressure sensor between the bearing and base plate to collect load data and injection pressures. The pressure sensor may be used to control machine parameters or even control a pressure applied to the fluid volume between the bearing plate and the base plate. The pressure sensor may be utilized to provide dynamic leveling of the bearing plate.

Embodiments of the present invention may also provide bearing optimization by selectively providing a pressurized fluid into a controlled volume defined between the bearing plate and the base plate and the sealing structure. The fluid pressure and/or flow rate may be controlled to adjust or maintain dimensions between the bearing components. In one embodiment, a dynamically controlled bearing assembly is provided by dynamically adjusting the pressures applied to one or multiple control volumes. In this manner, the fluid pressures can be controlled in response to measurements or other conditions signaling a deterioration or change of bearing dimensions.

Other purposes will appear in the ensuing specification, drawings and claims. The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
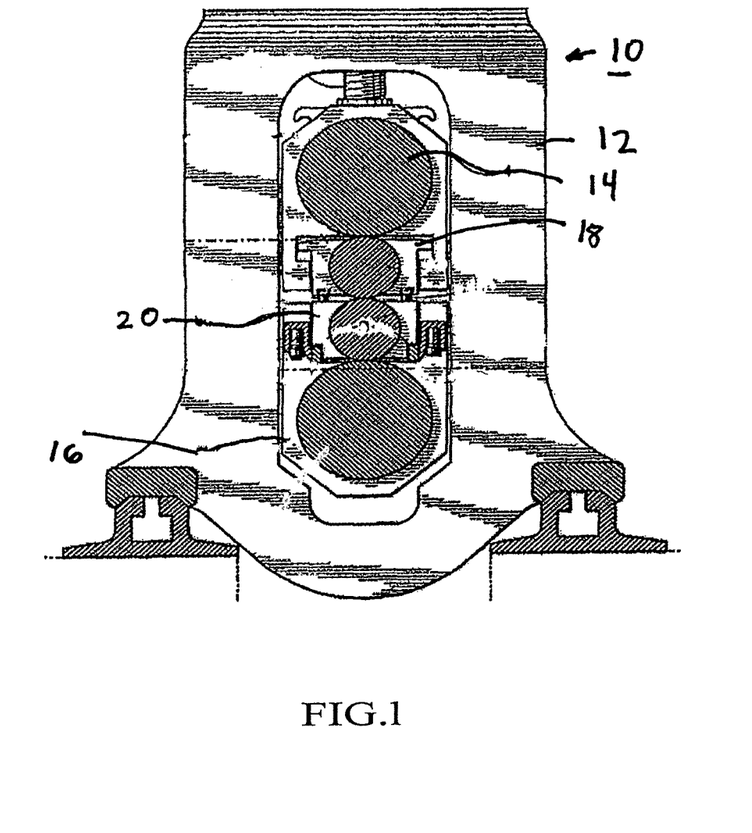
FIG. 1 is an illustration of a metal rolling stand upon which an embodiment of the present invention may be utilized.

FIG. 1 shows a typical "4-High" steel rolling mill stand 10 having a mill housing 12, back-up chocks 14 and 16 and work-roll chocks 18 and 20 while the bearing plates are mounted on the chocks and housings body. Such a mill stand is further disclosed in U.S. Pat. No. 6,408,667, incorporated by reference herein. The chocks 14, 16, 18, 20 are supported upon the bearing plates. Flat bearings are critical components in maintaining optimal rolling conditions, protecting housings and chocks from damage and reducing downtime related to maintenance of key mill components.

Figure 2:
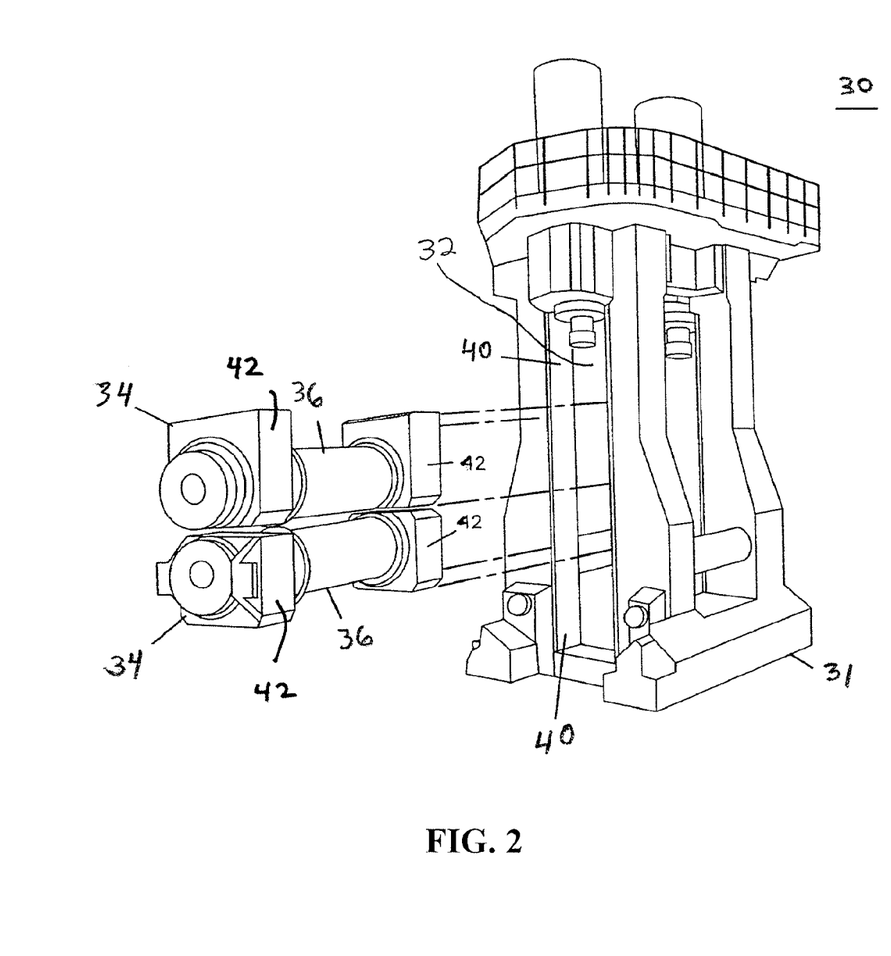
FIG. 2 is another illustration of a metal rolling stand.

FIG. 2 shows an example of a steel mill stand 30 having a housing 31 with a mill window 32, chocks 34 and rolls 36. Mill window bearing plates 40 and chock bearing plates 42 cooperate to support the chocks 34 and rolls 36. In operation, bearing plates 40 and 42 engage each other to provide linear guidance to the chocks 34 and rolls 36. In typical steel production facilities the bearing plates 40 and 42 operate in extremely hostile environments and are subject to high dynamic loads, abrasive elements, aggressive chemicals and high heat. While FIG. 2 depicts a typical application of linear bearing plates in rolling mills, other embodiments of this invention are not limited to such an application. It should be appreciated that a variety of flat bearing systems may utilize the teaching of the present invention.

Additional descriptions of linear bearings particularly suitable with the present invention are disclosed in applicant's U.S. patent application Ser. No. 12/263,260, filed Oct. 31, 2008, entitled "Linear Bearing Plate for Rolling Mill," having Publication No. US2009/0165521A1, and being incorporated by reference herein.

Figure 3:
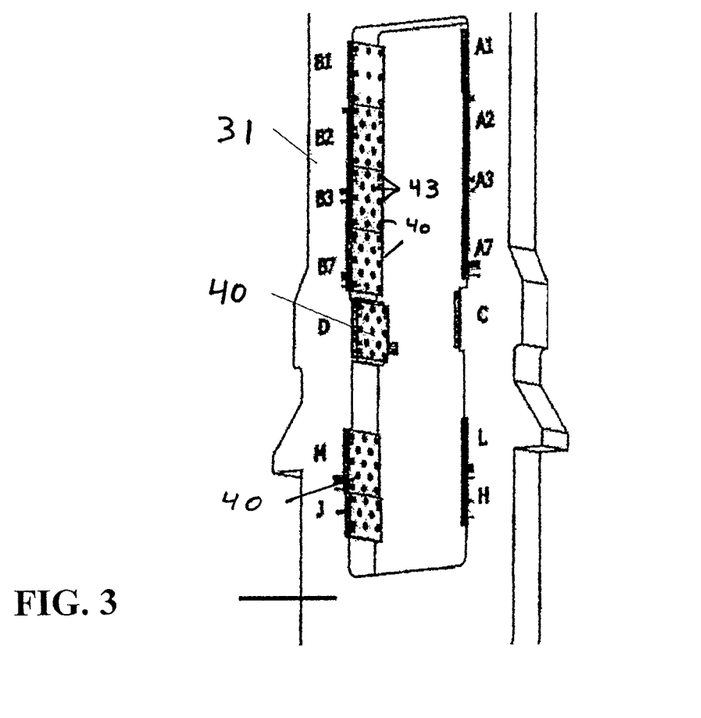
FIG. 3 illustrates a portion of the mill stand.

FIG. 3 depicts a plurality of mill window bearing plates 40 within housing 31. The bearing plates 40 are secured to the housing 31 via a plurality of threaded fasteners 43. Each of the bearing plates 40 is subject to a different load profile and environmental conditions.

Figure 4:
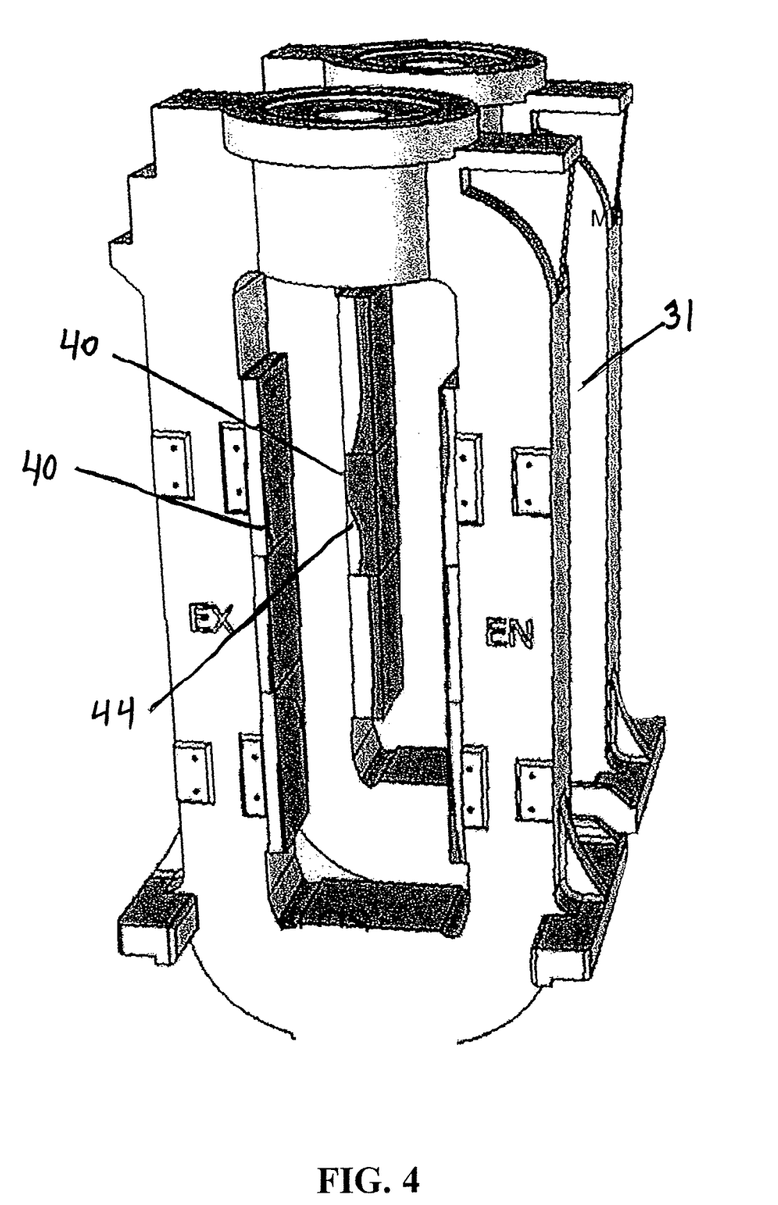
FIG. 4 illustrates a portion of the mill stand.

FIG. 4 depicts a somewhat exaggerated wear-profile 44 on worn bearing plates 40 in the mill window of mill housing 31. The wear profile 44 is non-linear with certain portions of the bearing plates 40 being significantly more worn than other portions.

Figure 5:
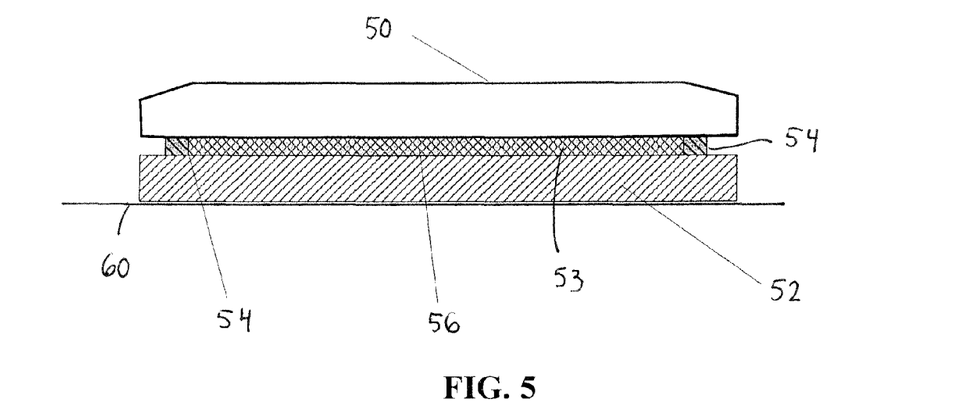
FIG. 5 is a cross-sectional view taken through a linear bearing assembly in accordance with the present invention.

FIG. 5 depicts a cross-sectional view of a bearing assembly in accordance with the present invention. FIG. 5 illustrates one embodiment of the present invention where the bearing plate 50 and the base plate 52 define an inner volume 53, surrounded by an appropriate sealing structure 54 to contain an injected resin or other fluid 56. The base plate 52 is preferably be made from an appropriate, semi-elastic material to bear the loads of the rolling mill application. Base plate 52 may also be selected of a material suitable to engage the mounting surface 57 of the machine body 60 (e.g., mill housing 31). The base plate 52 is supported, for example in a vertical orientation, on the mounting surface 57. The resin or other fluid 56 can be injected into volume 53 during, for example, a maintenance procedure or during normal operating conditions.

The resin or other fluid 56 may be injected via an injection port located on the base plate 52 or the bearing plate 50 or the sealing structure 54. The injection port may be integrated into the design of the base plate or bearing plate with an external coupling being made to a pressurized fluid source.

Figure 6:
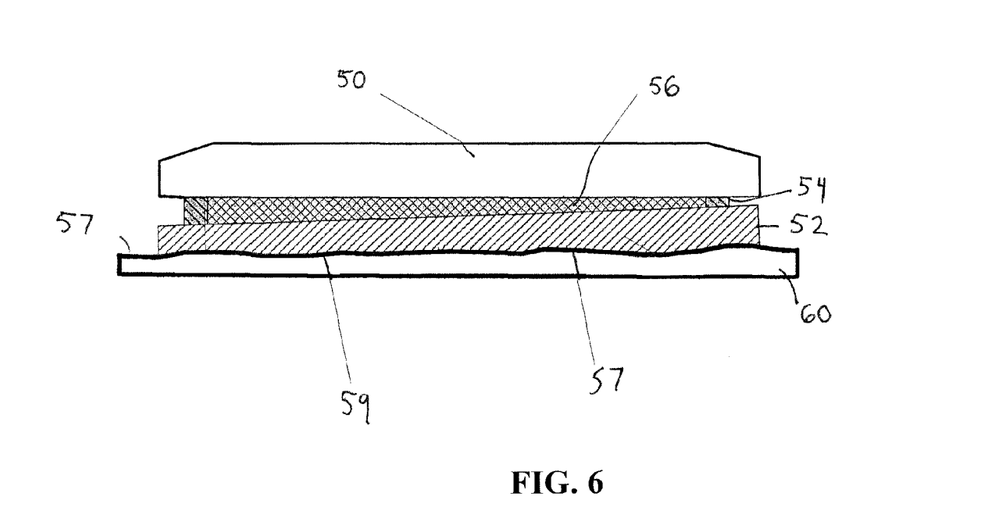
FIG. 6 is a cross-sectional view of the bearing assembly of FIG. 5 after a period of use.

FIG. 6 illustrates the bearing plate 50 and base plate 52 separated by variable thickness resin layer 56. A variable height sealing structure 54 maintains the injected resin within the desired volume. In this illustration, the base plate 52 and mounting surface 57 of the machine body 60 are substantially worn. The surrounding seal structure 54 can be designed to accommodate the non-parallel relation between the bearing plate 50 and the base plate 42 caused by wear. A layer of corrosion protection 59 can be applied between the base plate 52 and the machine body 60.

Figure 7:
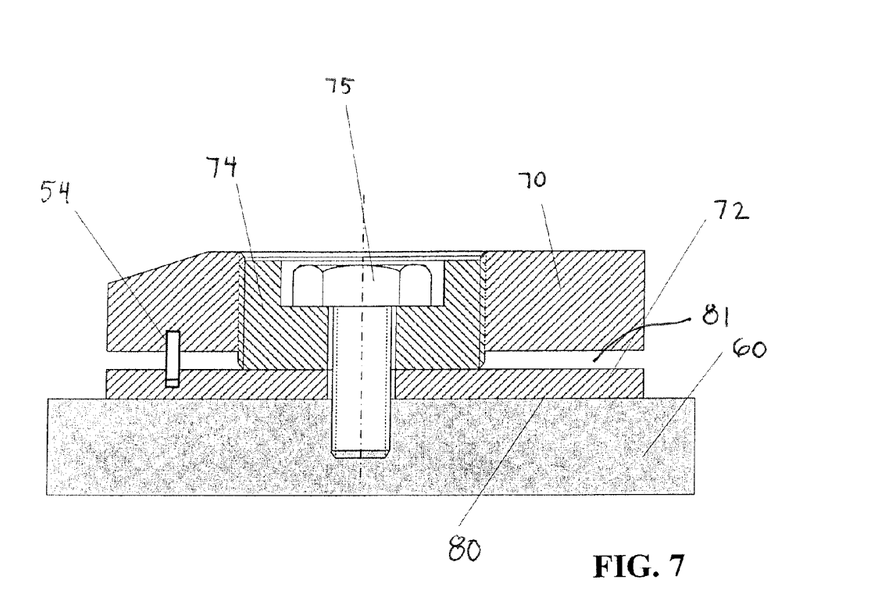
FIG. 7 is a cross-sectional view taken through another embodiment of a linear bearing assembly in accordance with the present invention.
Figure 8:
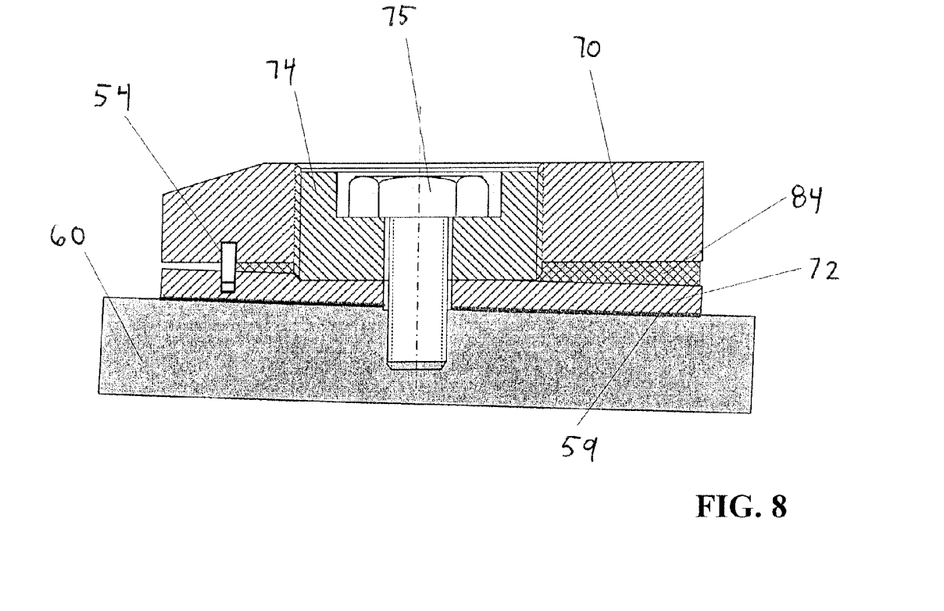
FIG. 8 is a cross-sectional view of the bearing assembly of FIG. 7 after a period of use.

Referring now to FIGS. 7 and 8, another embodiment of the invention is shown with bearing plate 70 positioned relative to base plate 72. The bearing plate 70 is fixed to the base plate 72 by a combination of a threaded thrust bushing 74 and a tension bolt 75. The surrounding seal structure 54 is secured to the bearing plate 70 and/or base plate 72. The surrounding seal structure 54 is shown partially positioned in channels of the base plate 72 and bearing plate 70.

As the mounting surface 80 of the machine body 60 is worn out and becomes non-parallel to the bearing surfaces, the bearing plate 70 is adjusted by the combination of threaded thrust bushing 74 and tension bolt 75. It is desirable that the base plate 72 be semi-elastic in order to compensate for the differing orientation of the bearing plate 70 and the mounting surface 80 of the machine body 60 to each other. After the bearing plate 72 is adjusted, resin 84 can be securely injected into the protected and sealed volume 81 between the bearing plate 70 and the base plate 72. An anti-corrosion agent 59 is provided between the base plate 72 and the machine body 60 for the long term corrosion protection of the mounting surface 80.

The volume 81 defined between the bearing plate 70 and the base plate 72 and bounded by the sealing structure 54 may be filled with resin or other fluid, for example during a maintenance procedure. The volume may comprise a single or multiple portions. For example, the sealing structure 54 may define a plurality of separate resin/fluid volumes. The plurality of volumes may be independently filled with resin or other fluid or may be interconnected and filled during a single resin or fluid injection. The resin or other fluid can be injected at various pressures and flow rates depending on the needs of the overall system. In the case of an injected fluid which is non-setting, the fluid may be withdrawn after a period of time or additional fluid may be injected at a later time.

In another embodiment of the present invention, a non-setting fluid is introduced into the volume 81 and the fluid remains pressurized during subsequent use of the system. The fluid pressure may be controlled, for example, by a remote controller to adjust the parameters of the bearing. For example, a non-setting fluid may be dynamically controlled to vary the dimensions between the bearing plate 70 and the base plate 72 by dynamically changing the pressure of the fluid introduced into one or more volumes 81.

The sealing structure 54 may include O-rings or other flexible sealing devices. The sealing structure 54 may be adhered to either the bearing plate 70 or the base plate 72 or both. The sealing structure 54 may define a single wall or include multiple walls affording additional protection against blow-outs or other failures. The sealing structure 54 may be inserted into a channel or other relief to minimize movement of the sealing structure 54.

Figure 9:
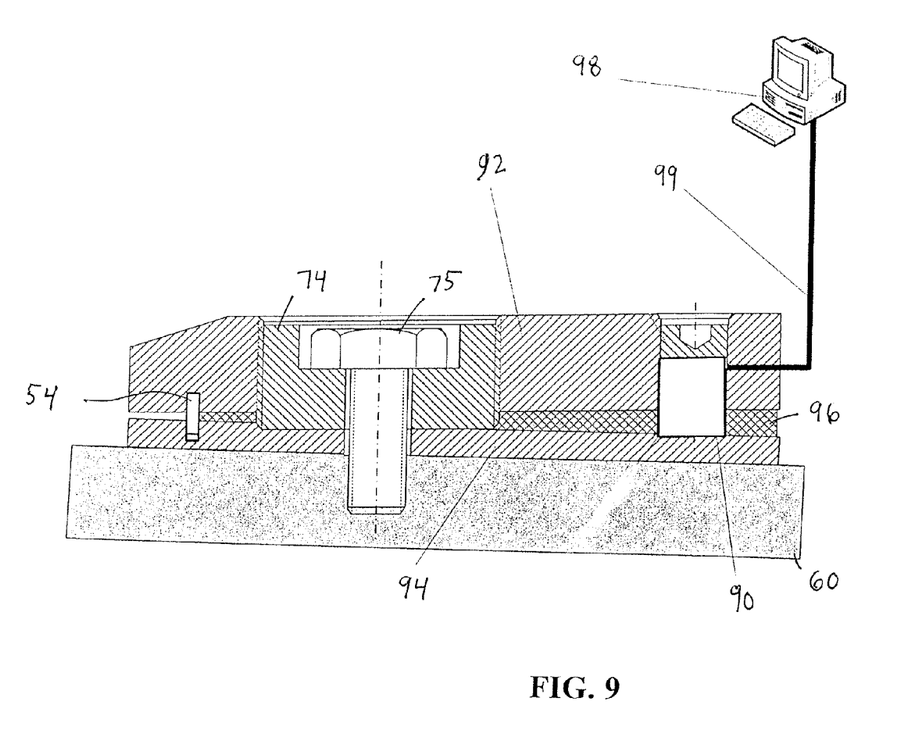
FIG. 9 is an illustration of yet another embodiment of the present invention.

Another embodiment of the present invention is provide in FIG. 9, wherein a pressure sensor 90 is mounted between the bearing plate 92 and base plate 94. The pressure sensor 90 is calibrated before, during or after injection of the resin material 96. The pressure sensor 90 is connected to the appropriate control panel 98 by the signal cable 99. The application of a pressure sensor 90 provides data leading to an improved understanding of the maximum loads on the bearing plate 92, such as for further analysis and benchmarking.

A variety of linear bearings may utilize aspects of the present invention. For example, during a repair procedure, resin may be injected one or more ports of a bearing plate with other ports acting as vent ports. In one embodiment, the resin is a polymer-concrete combination having crystalline particles of different sizes to optimize filling of the volume between the bearing plate and the base plate. The polymer may be between 5% to 10% of the total volume to yield a resin of relatively high strength and pressure resistance.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A linear bearing assembly and a mill stand comprising:
    a mill stand for rolling steel products and having a mill window;
    a linear bearing plate having a plurality of apertures, said linear bearing plate being held within the mill window;
    a base plate adapted to support the linear bearing plate, said base plate being held against a mill stand surface within the mill window;
    a metal thrust bushing inserted into one of the plurality of apertures in the linear bearing plate and directly engaging both the linear bearing plate and the base plate;
    a threaded fastener passing through said thrust bushing and securing the thrust bushing and base plate and linear bearing plate to the mill stand;
    a sealing structure defined between the bearing plate and the base plate, said sealing structure including at least a channel in the linear bearing plate and a channel in the base plate with a seal inserted into both channels and adapted to seal a volume defined between the linear bearing plate and the base plate; and
    a hardening resin adapted to be injected into the volume via at least one injection port wherein an orientation between the linear bearing plate and the base plate is adjustable, and with no portion of the hardening resin being positioned between a head of the threaded fastener and the base plate.

2. The linear bearing assembly and mill stand of claim 1 wherein the base plate and the bearing plate are vertically oriented within the mill stand and the metal thrust bushing is generally cylindrical with side surfaces directly engaging an inner surface of said one of the plurality of apertures in the linear bearing plate and a flat end directly engaging the base plate.

3. The linear bearing assembly and mill stand of claim 1 further comprising: at least one pressure sensor adapted to provide a signal representative of a pressure within said volume before, during or after a resin injection.

4. A linear bearing assembly and mill stand comprising:
    a mill stand for rolling steel products, said mill stand having a mill window;
    a base plate positioned within the mill window and adapted to support a linear bearing plate within the mill stand;
    a metal thrust bushing and threaded fastener for holding the linear bearing plate against the base plate, with said thrust bushing directly engaging both the linear bearing plate and the base plate, and said threaded fastener securing the linear bearing plate and base plate to the mill stand;
    a sealing structure defined between the linear bearing plate and the base plate, said sealing structure including a channel in the base plate and a channel in the linear bearing plate with a seal inserted into both channels and adapted to at least partially seal a volume defined between the base plate and the bearing plate; and
    a hardening resin material injected into the volume via at least one injection port with an orientation between the base plate and the linear bearing plate being fixed by said resin material.

5. The linear bearing assembly and mill stand of claim 4 further comprising: a plurality of metal-working rolls supported on chocks, with said chocks transferring loads to said linear bearing plate and said base plate.

6. The linear bearing assembly and mill stand of claim 5 further comprising a plurality of bearing plates, with each of said plurality of bearing plates being separately and independently adjustable via said fluid injection.

7. The linear bearing assembly and mill stand of claim 4 further comprising: at least one pressure sensor adapted to provide a signal representative of a pressure within said volume before, during or after said resin injection, and wherein no portion of the hardening resin is positioned between a head of the threaded fastener and the base plate.

8. The linear bearing assembly and mill stand of claim 7 further comprising a data processor for collecting pressure data and for providing a report designed to optimize a fluid injection procedure.

9. A method of adjusting a linear bearing assembly secured to a metal rolling stand, said method comprising:
    providing a linear bearing plate and a base plate adapted to support the linear bearing plate within a metal rolling stand, with a channel in the bearing plate and a channel in the base plate;
    securing the linear bearing plate to the base plate with a metal thrust bushing and threaded fastener, said thrust bushing passing through an aperture in the linear bearing plate and directly engaging the base plate at one end of the thrust bushing and directly engaging an inner surface of said aperture in the linear bearing plate;
    placing a sealing structure between the bearing plate and the base plate, said sealing structure being inserted into both channels and being adapted to seal a volume defined between the linear bearing plate and the base plate; and
    injecting a hardening resin material into the volume via at least one injection port, with said resin material being injected at a sufficient pressure so as to alter an orientation of the linear bearing plate or the base plate toward an initial geometric orientation, with an output of the metal rolling stand being altered based on said resin material injecting.

10. The method of claim 9 wherein the hardening resin maintains the orientation of the linear bearing plate and the base plate upon hardening, and wherein no portion of the hardening resin is positioned between a head of the fastener and the base plate.

11. The method of claim 9 further comprising:
    determining a pressure within the volume with a pressure sensor and adjusting the pressure of the resin material injection based on said determining.

* * * * *